United States Patent [19]
Yoneyama

[11] Patent Number: 6,115,194
[45] Date of Patent: Sep. 5, 2000

[54] PROJECTION LENS

[75] Inventor: Kazuya Yoneyama, Omiya, Japan

[73] Assignee: Fuji Photo Optical Co., Ltd., Omiya, Japan

[21] Appl. No.: 09/327,962

[22] Filed: Jun. 8, 1999

[30] Foreign Application Priority Data

Jul. 23, 1998 [JP] Japan ................................. 10-207285

[51] Int. Cl.[7] .................................................. G02B 9/36
[52] U.S. Cl. ......................... 359/757; 359/754; 359/755; 359/756; 359/649
[58] Field of Search .................................. 359/754, 755, 359/756, 757, 649, 650, 651

[56] References Cited

U.S. PATENT DOCUMENTS

| | | | |
|---|---|---|---|
| 2,687,063 | 8/1954 | Coleman | 359/649 |
| 3,909,115 | 9/1975 | Kano | 350/214 |
| 5,831,770 | 11/1998 | Matsuzawa et al. | 359/649 |

FOREIGN PATENT DOCUMENTS 7-294809  11/1995  Japan.

*Primary Examiner*—Georgia Epps
*Assistant Examiner*—Tim Thompson
*Attorney, Agent, or Firm*—Arnold International; Bruce Y. Arnold

[57] ABSTRACT

By satisfying certain specified conditions, a projection lens having six lens groups and a low F-number of 1.4 is disclosed wherein a maximum angle between a principal ray and the optical axis on the reducing side of the projection lens is 2.5° or less. This enables the projection lens to be used with a display which must be illuminated by light that is orthogonal to a display surface (as is the case with a liquid crystal display) without significant loss of light at the periphery of the image. Further, the projection lens can have its aberrations favorably corrected and be compact.

10 Claims, 6 Drawing Sheets

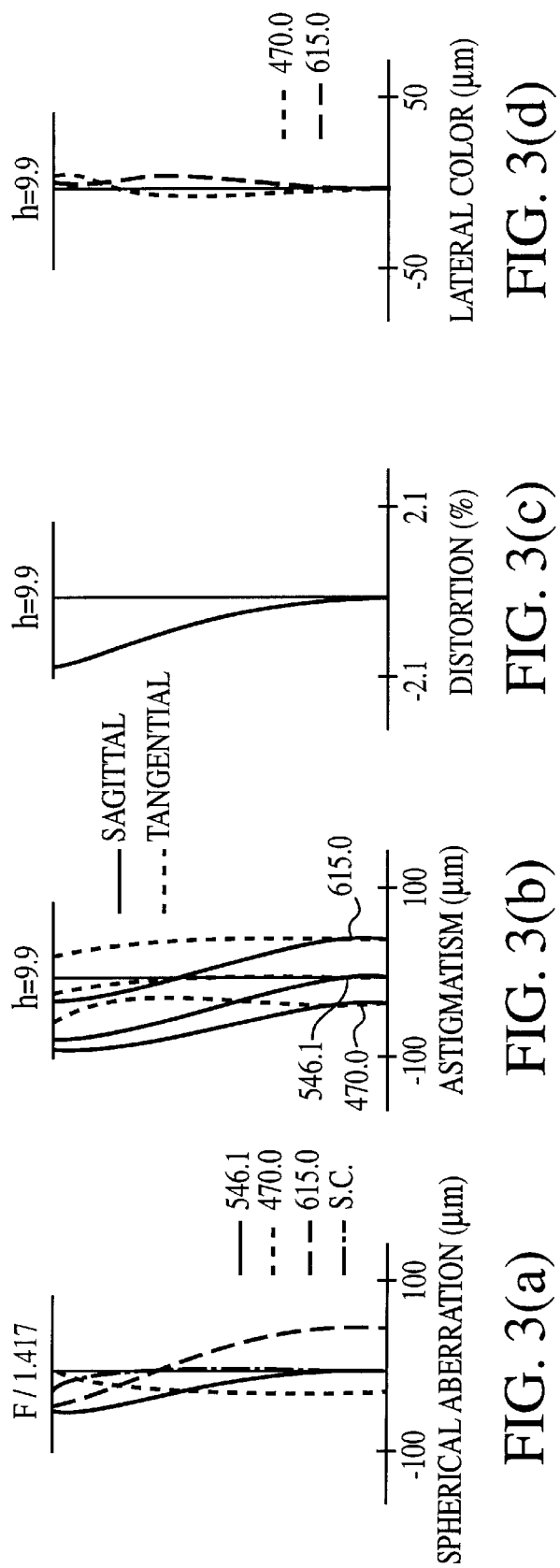

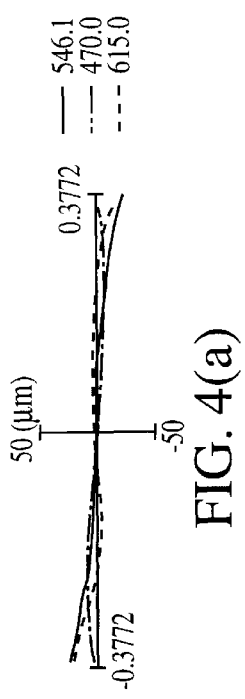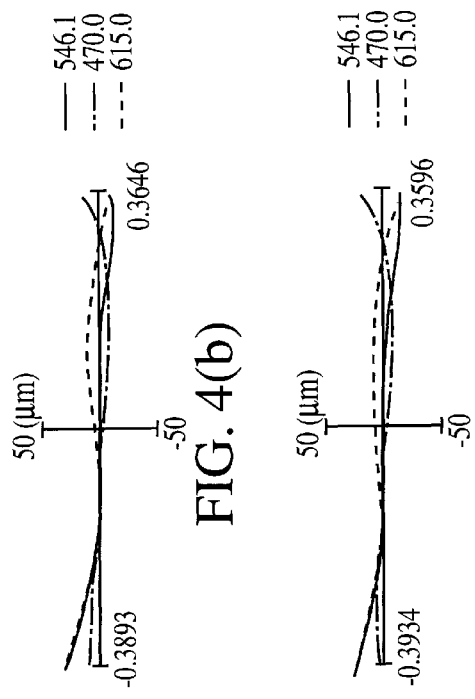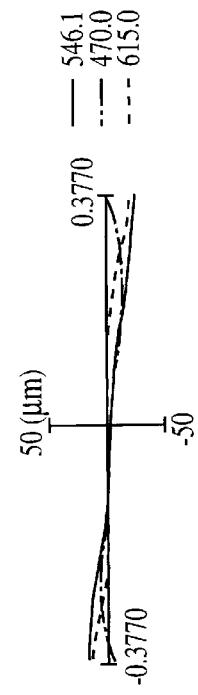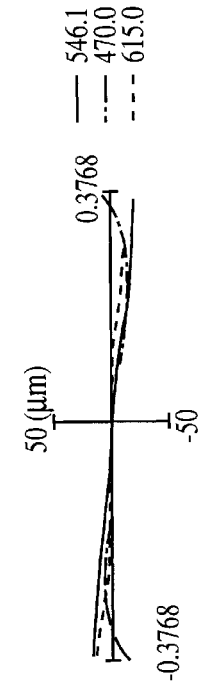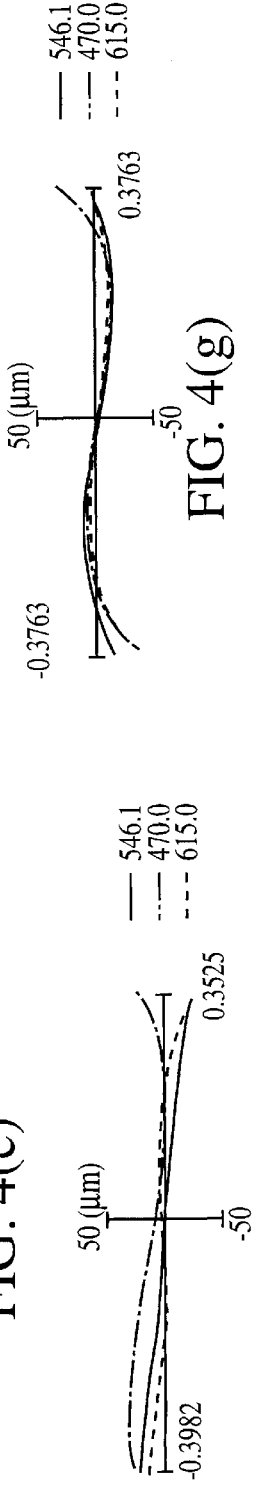

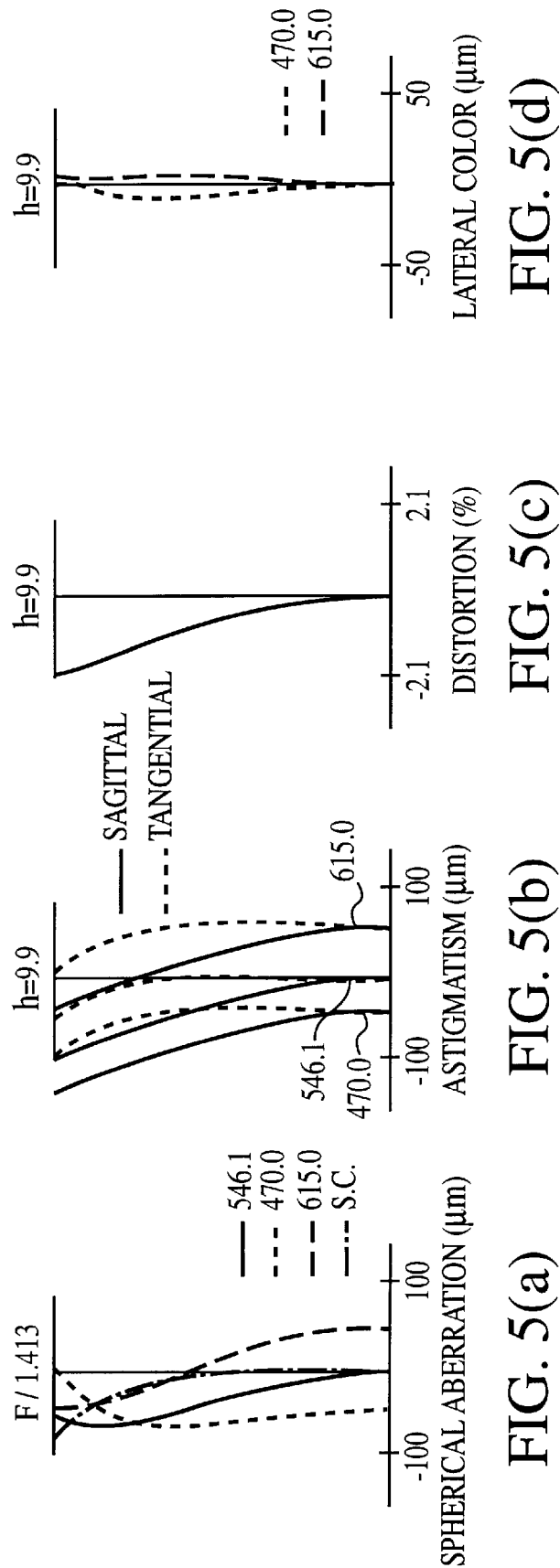

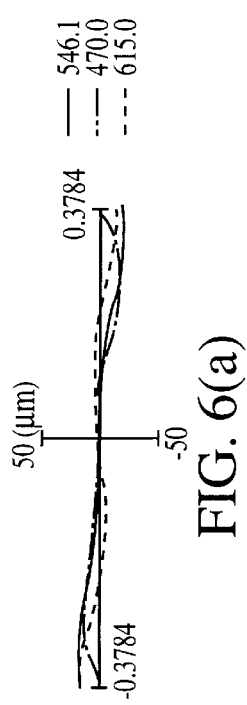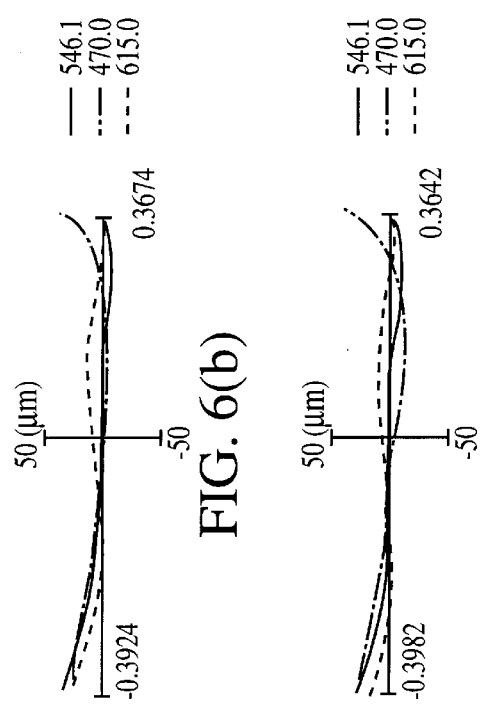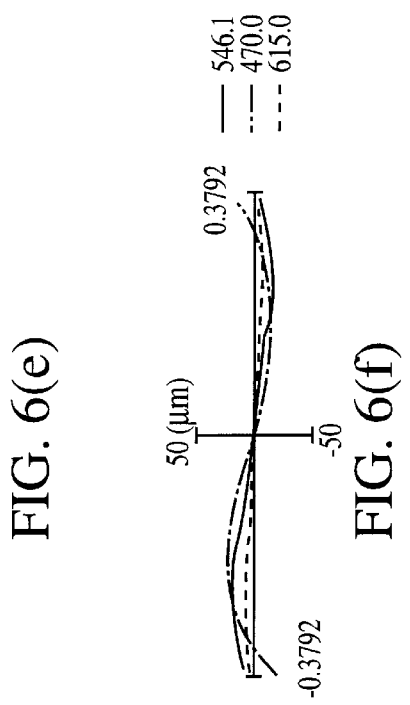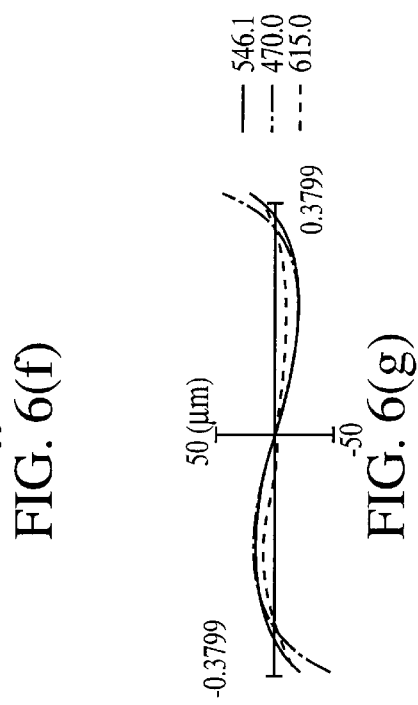

PROJECTION LENS

BACKGROUND OF THE INVENTION

Various projection lenses for use in video projectors having a liquid crystal display are known in the prior art. These video projectors emit light onto the back surface of a liquid crystal display. The light is then modulated by an image formed on the liquid crystal display and the image of the modulated light is then enlarged by a projection lens and projected onto a screen. One side of the projection lens is termed the reducing side, and it is on this side that the liquid crystal display is to be located. The other side of the projection lens is termed the enlarging side, and it is on this side that an enlarged image of that formed at the liquid crystal display is viewed by being projected onto a screen.

For proper operation of the liquid crystal display, it is necessary for the rays to be incident nearly orthogonally onto the back surface of the liquid crystal display. Thus, to prevent unnecessary loss of light, it is desirable for the projection lens used in this kind of liquid crystal projector to be nearly telecentric on its reducing side. In addition, because the extinction ratio for this type of display is relatively large, it is desirable to employ a lens which forms a bright image, ie., for the lens to have a low F-number. In particular, a lens having an F-number of about 1.4 or less is required.

Japanese Patent Application 7-294809 and U.S. Pat. No. 2,687,063 each disclose a prior art projection lens in which various aberrations are favorably corrected. However, the projection lens disclosed in Japanese Patent Application 7-294809 has a problem in that the F-number value is approximately 2.0, and the maximum angle of a principal ray on the reducing side (hereinafter termed the telecentric angle) is 6° relative to the optical axis. Therefore, this system is not nearly telecentric on its reducing side. Thus, such a lens will result in unnecessary loss of light at the periphery of the image when used with a display which requires the light to be orthogonal to the display surface, as in the case with a translucent liquid crystal display, for example.

On the other hand, the projection lens disclosed in U.S. Pat. No. 2,687,063 yields a brighter image in that it has a lower F-number value of 1.7. However, the telecentric angle is 5° relative to the optical axis. Therefore, this lens also is not nearly telecentric on its reducing side, resulting in extinction of light near the periphery of the lens when used with a display that requires its back side to be illuminated with light that is orthogonal to its surface. Furthermore, certain aberrations, such as distortion, are large. Therefore, this lens is not suitable for use as a projection lens in state-of-the-art projectors.

BRIEF SUMMARY OF THE INVENTION

The present invention relates to a projection lens for use with a liquid crystal display, and, more particularly, relates to a bright projection lens in which the rays on the reducing side of the projection lens are nearly telecentric. A first object of the present invention to provide a projection lens that has its aberrations favorably corrected. A second object of the invention is to provide a projection lens that is nearly telecentric on its reducing side so that there is little peripheral extinction of light when used with a display that must be illuminated orthogonally on its back side. A third object of the invention is to provide a lens which yields a bright image as a result of having a low F-number of about 1.4. In a projection lens it is strongly desired that the apparatus as a whole be small and lightweight. Hence, a fifth object of the present invention is to provide a projection lens that is compact.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3(a)–3(d) show the spherical aberration, a astigmatism, distortion and lateral, color, respectively for the lens according to Embodiment 1, FIGS. 4(a)–4(g) show the coma for the lens according to Embodiment 1, FIGS. 5(a)–5(d) show the spherical aberration, astigmatism, distortion and lateral color, respectively for the lens according to Embodiment 2, and FIGS. 6(a)–6(g) show the coma for the lens according to Embodiment 2.

DETAILED DESCRIPTION

Figure 1:
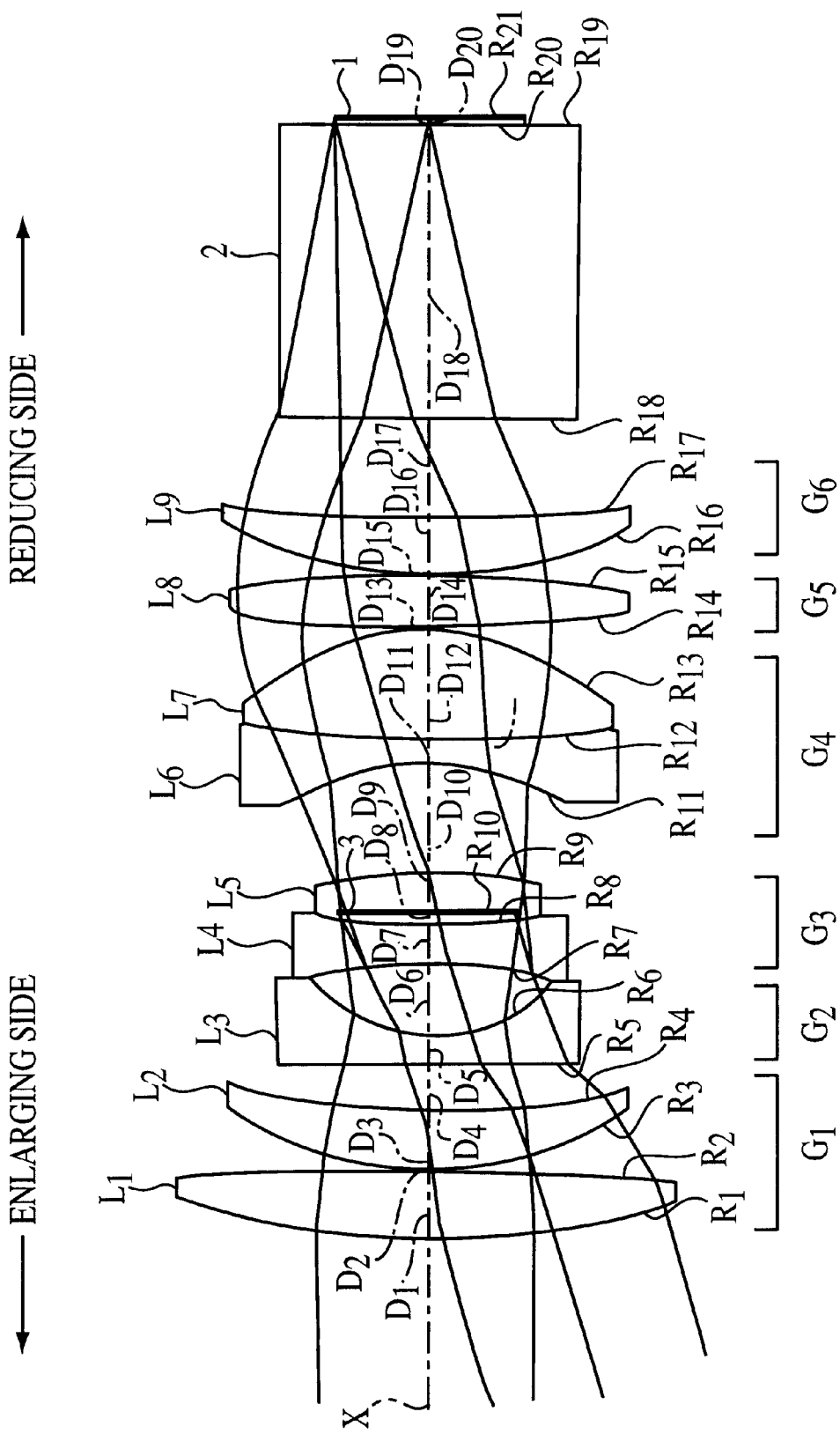
FIG. 1 is a schematic diagram showing the basic lens structure according to a first embodiment of the present invention.

The present invention is a projection lens which includes, in order from the enlarging side of the projection lens: a first lens group of positive refractive power; a second lens group of negative refractive power; a third lens group of positive refractive power and including a negative lens element and a positive lens element, in that order; a fourth lens group of negative refractive power and including a negative lens element and a positive lens element, in that order; a fifth lens group of positive refractive power; and, a sixth lens group of positive refractive power. Further, the projection lens is structured so that its telecentric angle on the reducing side is 2.5° or less, and the following Conditions (1)–(4) are satisfied.

| | |
|---|---|
| $0.40 < F/F_{56} < 1.4$ | Condition (1) |
| $1.75 < n_{AVE}$ | Condition (2) |
| $35 < v_{AVE} < 55$ | Condition (3) |
| $-2.5 F/F_2 < 0.5$ | Condition (4) | where

F is the focal length of the projection lens, $F_{56}$ is the composite focal length of the fifth lens group and sixth lens group, $n_{AVE}$ is the average value of the indices of refraction of the positive lens elements of the projection lens, $v_{AVE}$ is the average value of the Abbe numbers of the positive lens elements of the projection lens, and $F_2$ is the focal length of the second lens group.

Each of the Conditions (1)–(4) will now be discussed. Condition (1) ensures that the rays are nearly telecentric on the reducing side of the projection lens, and this Condition also ensures that various aberrations are favorably corrected. When the lower limit of Condition (1) is breached, the telecentric angle on the reducing side of the lens becomes large. On the other hand, when the upper limit is breached, the distortion becomes excessive, making aberration correction difficult.

Conditions (2) and (3) are used in controlling the peripheral extinction while achieving a low F-number. When the lower limit of Condition (2) is breached, it becomes difficult to correct various aberrations with a projection lens having a low F-number. On the other hand, when the range given by Condition (3) is not met, it becomes difficult to correct chromatic aberrations of the projection lens.

Furthermore, Condition (4) is used to keep the overall length of the projection lens sort while maintaining well-corrected coma aberrations. When the lower limit of Condition (4) is breached, coma becomes excessive. On the other hand, when the upper limit of Condition (4) is breached, it becomes difficult to achieve favorable aberration correction while keeping the overall length of the projection lens short.

In the preferred embodiments: the first lens group includes a positive lens element that is biconvex; the second lens group consists of a single negative lens element; the third lens group and the fourth lens group each include a negative lens element that is cemented to a positive lens element, in that order from the enlarging side of the projection lens; and the fifth lens group and sixth lens group each consist of a single positive lens element.

Two embodiments of the present invention will now be described with reference to the drawings.

Embodiment 1

As shown in FIG. 1, the projection lens of this first embodiment comprises the following lens elements, in order from the enlarging side: a first lens element $L_1$ formed of a biconvex lens having surfaces of different power with the surface of greater curvature on the enlarging side; a second lens element $L_2$ formed of a positive meniscus lens with its convex surface on the enlarging side; a third lens element $L_3$ formed of a biconcave lens having surfaces of different power with the surface of greater curvature on the reducing side; a cemented lens having a fourth lens element $L_4$ formed of a biconcave lens having surfaces of different power with the surface of greater curvature on the enlarging side and cemented to a fifth lens element $L_5$ formed of a biconvex lens having surfaces of different power with the surface of greater curvature on the reducing side; a cemented lens having a sixth lens element $L_6$ formed of a biconcave lens having surfaces of different power with the surface of greater curvature on the enlarging side cemented to a seventh lens element $L_7$ formed of a biconvex lens having surfaces of different power with the surface of greater curvature on the reducing side; an eighth lens element $L_8$ formed of a biconvex lens having surfaces of different power with the surface of greater curvature on the enlarging side; and a ninth lens element $L_9$ formed of a positive meniscus lens with its convex surface on the enlarging side.

The first lens element $L_1$ and the second lens element $L_2$ comprise a first lens group $G_1$, the third lens element $L_3$ comprises a second lens group $G_2$, the fourth lens element $L_4$ and the fifth lens element $L_5$ comprise a third lens group $G_3$, the sixth lens element $L_6$ and the seventh lens element $L_7$ comprise a fourth lens group $G_4$, the eighth lens element $L_5$. comprises a fifth lens group $G_5$ and the ninth lens element $L_9$ comprises a sixth lens group $G_6$.

A translucent liquid crystal display 1 and a color composition optical system 2 are arranged along the optical axis X on the reducing side of the projection lens. In addition, in this embodiment, a diaphragm 3 is positioned inside the fifth lens element $L_5$. Rays incident on the projection lens after passing through the liquid crystal display 1 carry image information. The image is thus enlarged and projected onto a screen (not illustrated) on the enlarging side of the lens.

Table 1 lists the surface #, in order from the enlarging side of the projection lens, the radius of curvature R (in mm) of each lens element surface, the on-axis surface spacing D (in mm), as well as the index of refraction $N_e$. and the Abbe constant ve at the e-line (546.1 μm) for each lens element of Embodiment 1. In addition, the radius of curvature of the surface corresponding to the diaphragm 3 is set as $R_{10}$, and $D_9$ is the on-axis distance from the diaphragm to the surface of the fifth lens element $L_5$ on the reducing side.

TABLE 1

| # | R | D | $N_\theta$ | $v_\theta$ |
|---|---|---|---|---|
| 1 | 78.0824 | 7.70000 | 1.704445 | 30.1 |
| 2 | −346.2385 | 0.30000 | | |
| 3 | 37.5533 | 6.42000 | 1.855065 | 23.8 |
| 4 | 86.9737 | 4.92000 | | |
| 5 | −629.5946 | 3.00000 | 1.855065 | 23.8 |
| 6 | 18.5532 | 7.51000 | | |
| 7 | −49.8672 | 4.00000 | 1.489151 | 70.2 |
| 8 | 74.8754 | 6.00000 | 1.808101 | 46.6 |
| 9 | −49.4312 | −4.36000 | | |
| 10 | ∞ | 16.36000 | | |
| 11 | −28.4560 | 3.00000 | 1.855065 | 23.8 |
| 12 | 228.9280 | 12.04000 | 1.776205 | 49.6 |
| 13 | −27.7681 | 0.30000 | | |
| 14 | 125.2737 | 5.44000 | 1.808101 | 46.6 |
| 15 | −153.7593 | 0.30000 | | |
| 16 | 46.4771 | 5.72000 | 1.808101 | 46.6 |
| 17 | 150.9219 | 11.26000 | | |
| 18 | ∞ | 32.00000 | 1.624089 | 36.3 |
| 19 | ∞ | 0.00000 | | |
| 20 | ∞ | 0.70000 | 1.460076 | 67.8 |
| 21 | ∞ | | | |

In this embodiment, the F-number is 1.4, the value of the telecentric angle is 1.5°, the peripheral brightness is 99% of that at the center of the lens, and each of the Conditions (1)–(4) is satisfied.

Embodiment 2

Figure 2:
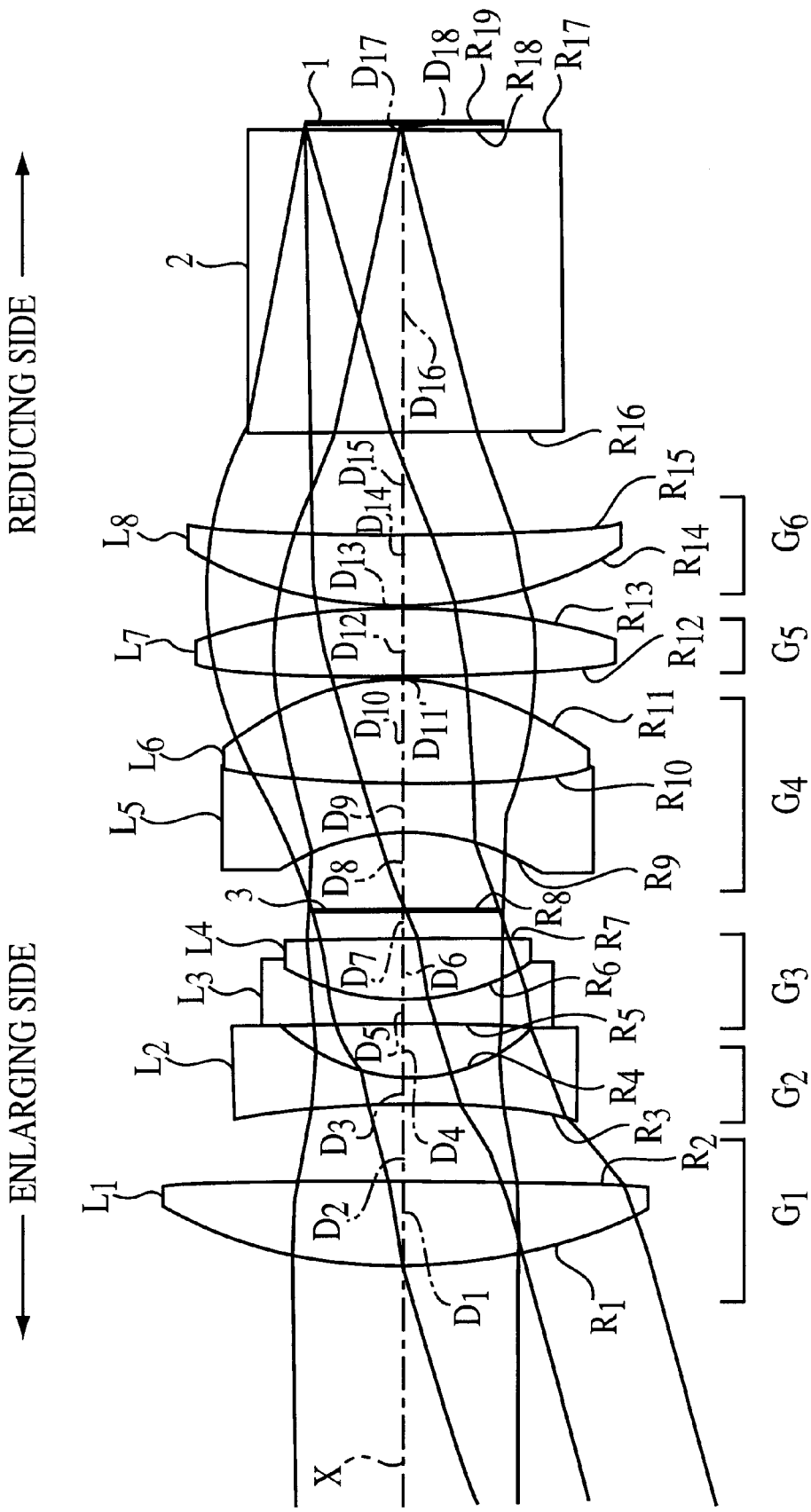
FIG. 2 is a schematic diagram showing the basic lens structure according to a second embodiment of the present invention.

As shown in FIG. 2, the projection lens of the second embodiment comprises, in order from the enlarging side: a first lens element $L_1$ formed of a biconvex lens having surfaces of different power with the surface of greater curvature on the enlarging side; a second lens element $L_2$ formed of a biconcave lens having surfaces of different power with the surface of greater curvature on the reducing side; a cemented lens formed of a third lens element $L_3$ that is a negative meniscus lens with its concave surface on the reducing side that is cemented to a fourth lens element $L_4$ that is a positive meniscus lens with its convex surface on the enlarging side; a cemented lens formed of a fifth lens element $L_5$ that is biconcave having different surface powers, with the surface of stronger curvature being on the enlarging side and cemented to a sixth lens element $L_6$ formed of a biconvex lens having different surface powers with the surface of greater curvature on the reducing side; a seventh lens element $L_7$ formed of a biconvex lens having different surface powers with the surface of greater curvature on the reducing side; and an eighth lens element $L_8$ formed of a positive meniscus lens with its convex surface on the enlarging side.

In this embodiment the first lens element $L_1$ comprises a first lens group $G_1$, the second lens element $L_2$ comprises a second lens group $G_2$, the third lens element $L_3$ and the fourth lens element $L_4$ comprise a third lens group $G_3$, the fifth lens element $L_5$ and the sixth lens element L6 comprise a fourth lens group $G_4$, the seventh lens element $L_7$ comprises a fifth lens group $G_5$ and the eighth lens element $L_8$ comprises a sixth lens group $G_6$. Also, diaphragm 3 is positioned between the fourth lens element $L_4$ and the fifth lens element $L_5$.

Table 2 lists the surface #, in order from the enlarging side of the projection lens, the radius of curvature R (in mm) of each lens element surface, the on-axis surface spacing D (in mm), as well as the index of refraction $N_e$ and the Abbe constant ve at the e-line (546.1 µm) for each less element of Embodiment 2.

TABLE 2

| # | R | D | Ne | ve |
|---|---|---|---|---|
| 1 | 58.0893 | 9.10000 | 1.808101 | 46.6 |
| 2 | −359.8826 | 7.80000 | | |
| 3 | −101.6593 | 3.00000 | 1.489151 | 70.2 |
| 4 | 20.0845 | 5.10009 | | |
| 5 | 520.5482 | 3.00000 | 1.489151 | 70.2 |
| 6 | 23.3358 | 6.00000 | 1.808101 | 46.6 |
| 7 | 615.5503 | 2.94000 | | |
| 8 | ∞ | 8.51000 | | |
| 9 | −22.7254 | 5.00000 | 1.855065 | 23.8 |
| 10 | 98.5966 | 11.10000 | 1.716150 | 53.9 |
| 11 | −27.8018 | 0.30000 | | |
| 12 | 212.8412 | 7.18000 | 1.808101 | 46.6 |
| 13 | −72.0148 | 0.30000 | | |
| 14 | 44.6976 | 7.04000 | 1.808161 | 46.6 |
| 15 | 179.5327 | 11.09000 | | |
| 16 | ∞ | 32.00000 | 1.624089 | 36.3 |
| 17 | ∞ | 0.00000 | | |
| 18 | ∞ | 0.70000 | 1.460076 | 67.8 |
| 19 | ∞ | 0.00000 | | |

For this embodiment the F-number is 1.4, the telecentric angle is 1.6°, the peripheral brihgtness is 100% as compared to the center of the lens, and Conditions (1) through (4) are all satisfied.

Table 3, below, summaries the F-number, the half-field angle, the telecentric angle, the peripheral brightness as a percentage of the brightness at the center of the lens, and the determined values for Conditions (1) through (4) for each embodiment of the present invention.

TABLE 3

| | Embodiment 1 | Embodiment 2 |
|---|---|---|
| F-number | 1.4 | 1.4 |
| Half-field angle (degrees) | 15.8 | 15.9 |
| Telecentric angle (degrees) | 1.5 | 1.6 |
| Peripheral brightness (%) | 99 | 100 |
| Condition (1) | 0.83 | 1.01 |
| Condition (2) | 1.79 | 1.79 |
| Condition (3) | 40.6 | 48.0 |
| Condition (4) | −1.66 | −1.03 |

FIGS. 3(a)–3(d) and FIGS. 5(a)–5(d) show the spherical aberration, astigmatism, distortion, and lateral color, respectively for Embodiments 1 and 2, respectively. The symbol "h" in each of these figures indicates the height of the image. In addition, in each illustration of spherical aberration, the sine condition S.C. illustrated is for light of wavelength 615.0 µm, and the spherical aberration and astigmatism illustrated are for light of wavelengths 546.1 µm, 470.0 µm and 615.0 µm FIGS. 4(a)–4(g) and FIGS. 6(a)–6(g); the coma for the above-described Embodiments 1 and 2, respectively. In each of these drawings sheets, coma in the tangential direction is illustrated by the four figures in the left column, and coma in the sagittal direction is illustrated by the three figures in the right column. The figures from top to bottom represent the coma at different picture angles. The figure at the top of the left column, i.e. FIG. 4(a), FIG. 6(a) illustrates the tangential coma on-axs, the figure beneath this i.e., FIG. 9(b), FIG. 6(b) represents the tangential coma at 50% maximum image height, the next figure beneath this i.e., FIG. 4(c), FIG. 6(c), represents the tangential coma at 70% maximum image height, and the bottom figures i.e., FIG. 4(d), FIG. 6(d), represents the tangential coma at maximum image height. For illustrating the coma in the sagittal direction, only three figures are given for each embodiment, since the sagittal coma on-axis is identical to the tangential coma on-axis. Thus, the remaining figures in the right column i.e., FIGS. 4(e)–4(g), FIGS. 6(e)–6(g), illustrate the sagittal coma at an image height corresponding 50% maximum image height i.e., FIG. 4(e), FIG. 6(e), 70% maximum image height i.e., FIG. 4(f), FIG. 6(f), and at maximum image height i.e., FIG. 4(g), FIG. 6(g), respectively. As is clear from FIGS. 3 through 6, in each of the above-described embodiments the various aberrations are favorably corrected.

The projection lens of the present invention is not limited to the above-described embodiments, for various alterations can be made. For example, it is possible to appropriately change the radius of curvature R of each lens element or the on-axis race spacing D. Further, although the embodiments illustrated are intended for use with a translucent liquid crystal display, it is also possible for the lens of the present invention to be used with a reflective liquid crystal display, or with other light modulators such as a digital mirror device, a deformable mirror device, or the like.

With the projection lens of the present invention, the telecentric angle on the reducing side is 2.5° or less and Conditions (1)–(4) are satisfied. Hence it is possible to make a projection lens having a low F-number of 1.4 be nearly telecentric on its reducing side, to thereby achieve a bright image even at the periphery of the projection lens in the case where a light modulator must be illuminated orthogonally for proper operation of the modulator. Further, it is possible to make the various aberrations favorable even for a lens having a low F-number of 1.4. By satisfying Condition (4), it is possible to favorably correct coma while ensuring that the projection lens has a small overall length.

The invention being thus described, it will be obvious that the same may be varied in many ways. Such variations are not to be regarded as a departure from the spirit and scope of the invention. Rather, the scope of the invention shall defined as set forth in the following claims and their legal equivalents. All such modifications as would be obvious to one skilled in the art are intended to be included within the scope of what is claimed.

What is claimed is:

1. A projection lens having one side that is an enlarging side, and another side that is a reducing side, said projection lens having no more than nine lens elements of positive of negative refractive power comprising, in order from the enlarging side of said projection lens:

a first lens group of positive refractive power;

a second lens group of negative refractive power;

a third lens group of positive refractive power and including a negative lens element and a positive lens element, in that order;

a fourth lens group of negative refractive power and including a negative lens element and a positive lens element, in that order;

a fifth lens group of positive refractive power;

and a sixth lens group of positive refractive power;

wherein there are no intervening lens elements between the enlarging side and said sixth lens group other than the first through fifth lens groups, and said projection lens is structured so that, on the reducing side, a maximum angle formed by a principal ray relative to the optical axis is 2.5° or less, and the following condition is satisfied $$0.40 < F/F_{56} < 1.4$$

where:

F is the focal length of the projection lens, and $F_{56}$ is the composite focal length of the fifth lens group and sixth lens group.

2. The projection lens of claim 1, wherein the following conditions are also satisfied $$1.75 < n_{AVE}$$

$$35 < v_{AVE} < 55$$

where $n_{AVE}$ is the average value of the indices of refraction of the positive lens elements of said projection lens, and $v_{AVE}$ is the average value of the Abbe numbers of the positive lens elements of said projection lens.

3. The projection lens of claim 1, wherein the following condition is also satisfied $$-2.5 < F/F_2 < -0.5$$

where $F_2$ is the focal length of the second lens group.

4. The projection lens of claim 2, wherein the following Condition is also satisfied $$-2.5 < F/F_2 < -0.5$$

where $F_2$ is the focal length of the second lens group.

5. The projection lens of claim 1, wherein the first lens group consists of a single positive lens element; the second lens group consists of a single negative lens element; the third lens group and the fourth lens group each consists of a cemented lens formed of a negative lens element cemented to a positive lens element, in order from the enlarging side; the fifth lens group consists of a single positive lens element; and sixth lens group consists of a single positive lens element.

6. The projection lens of claim 2, wherein the first lens group consists of a single positive lens element; the second lens group consists of a single negative lens element; the third lens group and the fourth lens group each consists of a cemented lens formed of a negative lens element cemented to a positive lens element, in order from the enlarging side; the fifth lens group consists of a single positive lens element; and sixth lens group consists of a single positive lens element.

7. The projection lens of claim 3, wherein the first lens group consists of a single positive lens element; the second lens group consists of a single negative lens element; the third lens group and the fourth lens group each consist of a cemented lens formed of a negative lens element cemented to a positive lens element, in order from the enlarging side; the fifth lens group consists of a single positive lens element; and sixth lens group consists of a single positive lens element.

8. The projection lens of claim 1, wherein the first lens group comprises, in order from the enlarging side of the projection lens, a biconvex lens element and a positive meniscus lens element with its convex surface on the enlarging side of the projection lens;

the second lens group consists of a single negative lens element;

the third lens group and fourth lens group each comprises a cemented lens formed of a negative lens element cemented to a positive lens element, in order from the enlarging side, and the fifth lens group and sixth lens group each consists of a single positive lens element.

9. The projection lens of claim 2, wherein the first lens group comprises, in order from the enlarging side of the projection lens, a biconvex lens element and a positive meniscus lens element with its convex surface on the enlarging side of the projection lens;

the second lens group consists of a single negative lens element;

the third lens group and fourth lens group each comprises a cemented lens formed of a negative lens element cemented to a positive lens element, in order from the enlarging side, and the fifth lens group and sixth lens group each consists of a single positive lens element.

10. The projection lens of claim 3, wherein the first lens group comprises, in order from the enlarging side of the projection lens, a biconvex lens element and a positive meniscus lens element with its convex surface on the enlarging side of the projection lens;

the second lens group consists of a single negative lens element;

the third lens group and fourth lens group each consists of a cemented lens formed of a negative lens element cemented to a positive lens element, in order from the enlarging side, and the fifth lens group and sixth lens group each consists of a single positive lens element.

* * * * *

UNITED STATES PATENT AND TRADEMARK OFFICE
CERTIFICATE OF CORRECTION

PATENT NO. : 6,115,194
DATED : Sep. 5, 2000
INVENTOR(S) : Yoneyama

It is certified that error appears in the above-identified patent and that said Letters Patent is hereby corrected as shown below:

At col. 2, line 18, change "lateral, color" to -- lateral color --;

At col. 3, line 9, change "sort" to -- short --;

At col. 4, line 62, change "L6" to -- $L_6$ --;

At col. 7, line 3 of claim 3 should read as follows:

$$-2.5 < F/F_2 < -0.5$$

Signed and Sealed this

Twenty-fourth Day of April, 2001

Attest:

NICHOLAS P. GODICI

*Attesting Officer*       *Acting Director of the United States Patent and Trademark Office*